(12) United States Patent
Chen et al.

(10) Patent No.: US 7,185,952 B1
(45) Date of Patent: Mar. 6, 2007

(54) ADJUSTING DEVICE FOR ROTATABLE ARMREST OF CHILD CAR SEAT

(75) Inventors: Shun-Min Chen, Taipei (TW); Jianqun Li, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 11/392,593

(22) Filed: Mar. 30, 2006

(30) Foreign Application Priority Data

Sep. 30, 2005 (CN) .......................... 2005 2 0129215

(51) Int. Cl.
*A47C 7/54* (2006.01)
(52) U.S. Cl. ................................................. 297/411.38
(58) Field of Classification Search ........... 297/411.32, 297/411.38, 250.1
See application file for complete search history.

(56) References Cited

U.S. PATENT DOCUMENTS

| | | | | |
|---|---|---|---|---|
| 4,496,190 A | * | 1/1985 | Barley ................... | 297/411.38 |
| 5,106,160 A | * | 4/1992 | Nomura et al. ........ | 297/411.32 |
| 5,984,416 A | * | 11/1999 | Waldo et al. .......... | 297/411.38 |
| 6,467,847 B2 | * | 10/2002 | Bidare .................... | 297/411.32 |
| 6,698,838 B2 | * | 3/2004 | Kain ....................... | 297/411.32 |
| 6,852,462 B2 | * | 2/2005 | Emoto et al. ............ | 430/109.4 |

FOREIGN PATENT DOCUMENTS

FR 2696387 * 4/1994

* cited by examiner

*Primary Examiner*—Milton Nelson, Jr.
(74) *Attorney, Agent, or Firm*—Bacon & Thomas, PLLC

(57) ABSTRACT

An adjusting device for rotatable armrest of a child car seat is provided. The adjusting device comprises an armrest support; an armrest pivotally coupled to the armrest support; a button operably disposed in the armrest; and an engaging assembly movably disposed in the armrest between the button and the armrest support and constructed such that the armrest can be locked in position or can be pivotally adjusted with respective to the armrest support by selective alignment between the button and the engaging assembly and a selective engagement/disengagement between the engaging assembly and the armrest support.

16 Claims, 6 Drawing Sheets

ADJUSTING DEVICE FOR ROTATABLE ARMREST OF CHILD CAR SEAT

FIELD OF THE INVENTION

The present invention relates generally to a child car seat, and more specifically to an adjusting device for rotatable armrest of a child car seat.

BACKGROUND OF THE INVENTION

Child car seats are dedicated seats for providing safety and comfort for children sitting in a vehicle. In order to enhance the comfort for the child, armrests are provided in many child car seats and most of the armrests are adjustable to allow the child to get in/get off the seat more easily. For instance, U.S. Pat. No. 6,698,838 B2 disclosed a child car seat with pivotable armrests. In addition, U.S. Pat. No. 6,676,212 B1 disclosed another child car seat with adjustable armrests. Although the armrests of these child car seats are adjustable, these armrests are either too complicate in structure or not easy to operate.

In view of the structural complexity and inconvenience drawbacks in adjustable armrest of the traditional child car seats, there exists a need for an armrest adjusting device of a child car seat which is structurally simplified and the arm rest can be adjusted in a simple and convenient way.

SUMMARY OF THE INVENTION

Accordingly, an object of the present invention is to provide an adjusting device for armrest of a child car seat which is structurally simplified and is convenient to operate so as to present a car seat with both safety and comfort for a child sitting therein.

To achieve this and other objects, an adjusting device for armrest of a child car seat is provided. The adjusting device comprises an armrest support, including a supporting portion and a coupling portion having a first engaging structure formed thereon; an armrest including an armrest portion and a connecting portion wherein the connecting portion is pivotably coupled to the coupling portion of the armrest support and has a second engaging structure formed thereon; a button operably disposed in the connecting portion of the armrest and including a body having a third engaging structure formed thereon; and an engaging assembly operably disposed between the connecting portion of the armrest and the coupling portion of the armrest support, and including an engaging block and a spring member operably biasing the engaging block toward the coupling portion of the armrest support, wherein the engaging block includes a fourth engaging structure for engaging with the second engaging structure of the connecting portion, a fifth engaging structure for selectively engaging/disengaging with the first engaging structure of the coupling portion, and a sixth engaging structure constructed such that when the first engaging structure engages with the fifth engaging structure, the sixth engaging structure will disengage from the third engaging structure of the button and thereby the armrest is locked relative to the armrest support, and when the first engaging structure is caused disengage from the fifth engaging structure, the armrest is free to pivot relative to the armrest support and the sixth engaging structure engages with the third engaging structure of the button.

According to a preferred embodiment of the present application, the first engaging structure includes a plurality of engaging notches formed in a side of the coupling portion facing the engaging assembly. The connecting portion of the armrest includes a bottom and a sidewall. The second engaging structure includes a plurality of protrusions axially inwardly protruding out from the sidewall of the connecting portion of the armrest. The third engaging structure includes at least one engaging through hole formed in the body of the button. The spring member is a coil spring. The fourth engaging structure includes a plurality of recesses formed on one side of the engaging block facing the connecting portion corresponding to the plurality of protrusions of the second engaging structure. The fifth engaging structure includes a plurality of teeth formed on one side of the engaging block facing the coupling portion of the armrest support at positions corresponding to the engaging notches.

The button further comprises a longitudinal through hole formed in the body to allow a pivot passing therethrough so as to allow the button to move in the connecting portion. The connecting portion of the armrest further comprises a partition, which defines a space in the connecting portion for accommodating the button therein. Each of the plurality of engaging notches has a first acting inclined face, and each of the plurality of teeth has a second acting inclined face for cooperating with the first acting inclined face. The sixth engaging structure includes at least one engaging key protruding out from one side of the engaging block facing the connecting portion of the armrest.

The adjusting device for armrest of a child car seat of this embodiment further comprises a button returning means for operably biasing the button, wherein the button returning means is integrally formed with the button.

According to another aspect of the present invention, an adjusting device for armrest of a child car seat is provided, the adjusting device comprises an armrest support, including a supporting portion and a coupling portion; an armrest including an armrest portion and a connecting portion, which is pivotably coupled to the coupling portion of the armrest support; a button operably disposed in the connecting portion of the armrest and including a body and an engaging through hole; and an engaging assembly operably disposed between the connecting portion of the armrest and the coupling portion of the armrest support, and including a engaging key which is constructed such that when the body of the button is caused to abut the engaging key, the engaging assembly will restrain the armrest from pivoting relative to the armrest support, and while the button is actuated to align the engaging through hole with the engaging key, the armrest together with the engaging assembly may pivot relative to the armrest support.

In this aspect, the engaging assembly includes a first acting inclined face, and the coupling portion of the armrest support includes an engaging notch and the engaging notch has a second acting inclined face for cooperating with the first acting inclined face. An operative cooperation between the first and second acting inclined faces may cause the engaging assembly to pivot relative to the armrest support. In addition, the engaging assembly comprises a spring member which operably biases the engaging assembly toward the armrest support.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings, wherein:

FIGS. 4a and 4b are perspective views illustrating operating stages between the engaging block and the button, wherein FIG. 4a illustrates the spatial relationship of the engaging block and the button while in a locked stage, and FIG. 4b illustrates the spatial relationship of the engaging block and the button while in an armrest adjusting stage;

DETAILED DESCRIPTION OF THE INVENTION

Figure 1:
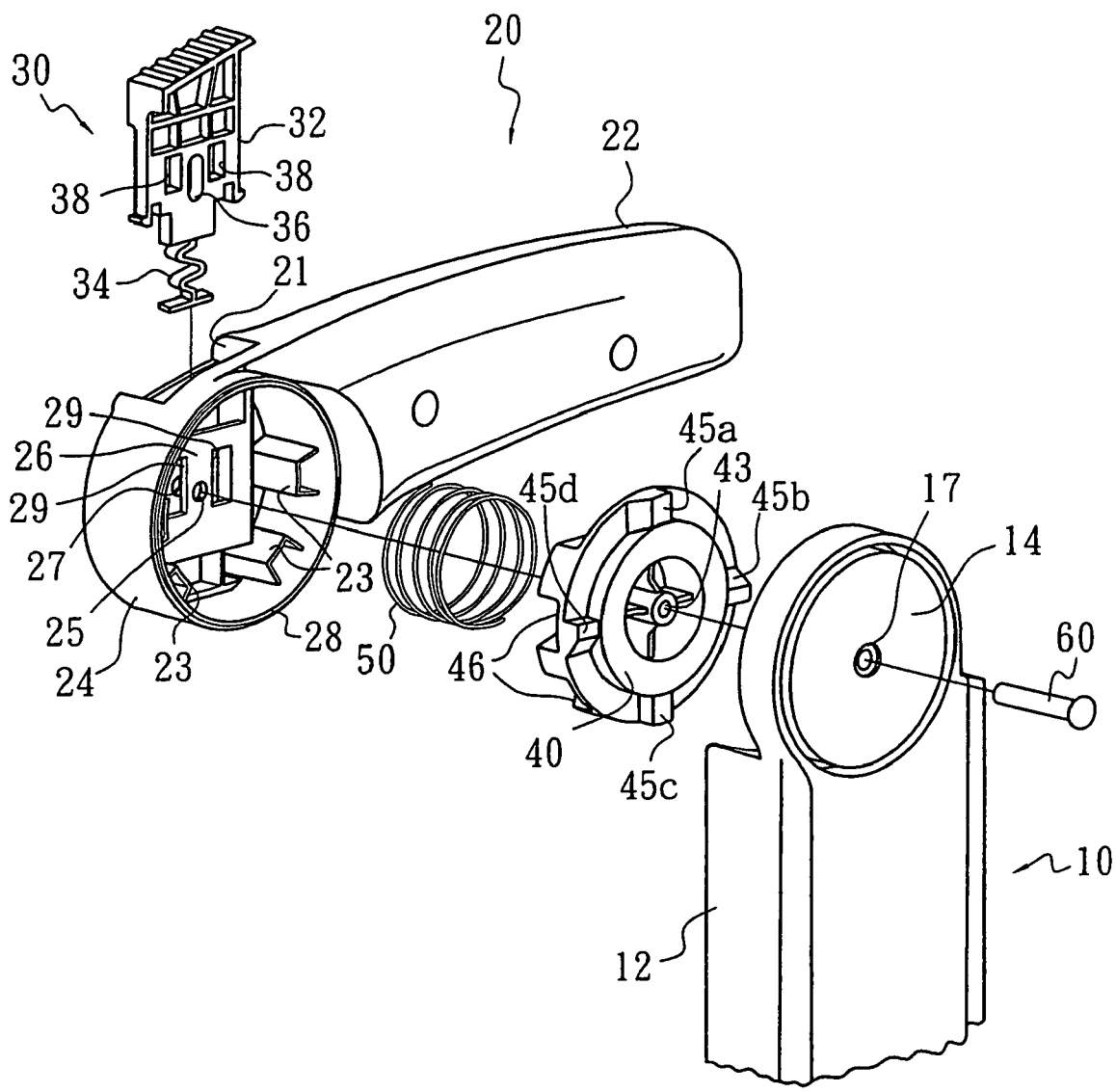
FIG. 1 is an exploded perspective view of an adjusting device for an armrest of a child car seat according to one embodiment of the present invention.

Referring now to the drawings in which an embodiment of the present invention is illustrated to describe the present invention.

Figure 2:
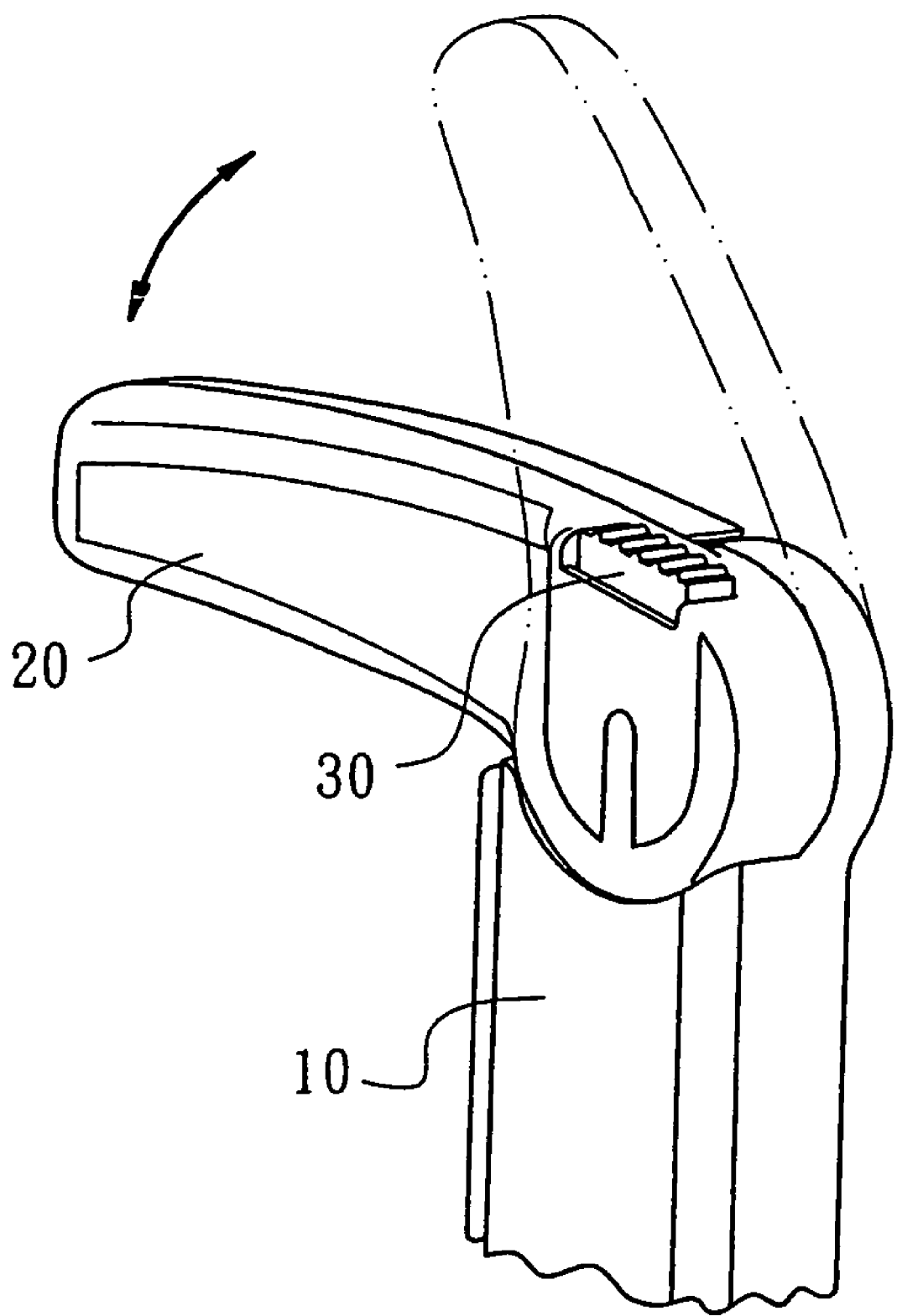
FIG. 2 is an assembled perspective view of the an adjusting device for armrest of a child car seat shown in FIG. 1.

FIG. 1 is an exploded perspective view of an adjusting device for an armrest of a child car seat according to one embodiment of the present invention and FIG. 2 is an assembled perspective view thereof. As shown in FIG. 1, the adjusting device of the present invention generally includes a armrest support 10 coupled to a child car seat (not shown), an armrest 20 pivotably adjustably coupled to an armrest support 10 mounted on the child car seat, a button 30 operably coupled to the armrest 20, an engaging block 40 disposed between the armrest support 10 and the armrest 20 at a position that it can cooperate with the button 30 to selectively lock the armrest 20 in a horizontal position or allow the armrest 20 to be pivoted to a vertical open position, and a return spring 50 disposed between the button 30 and the engaging block 40.

Figure 3:
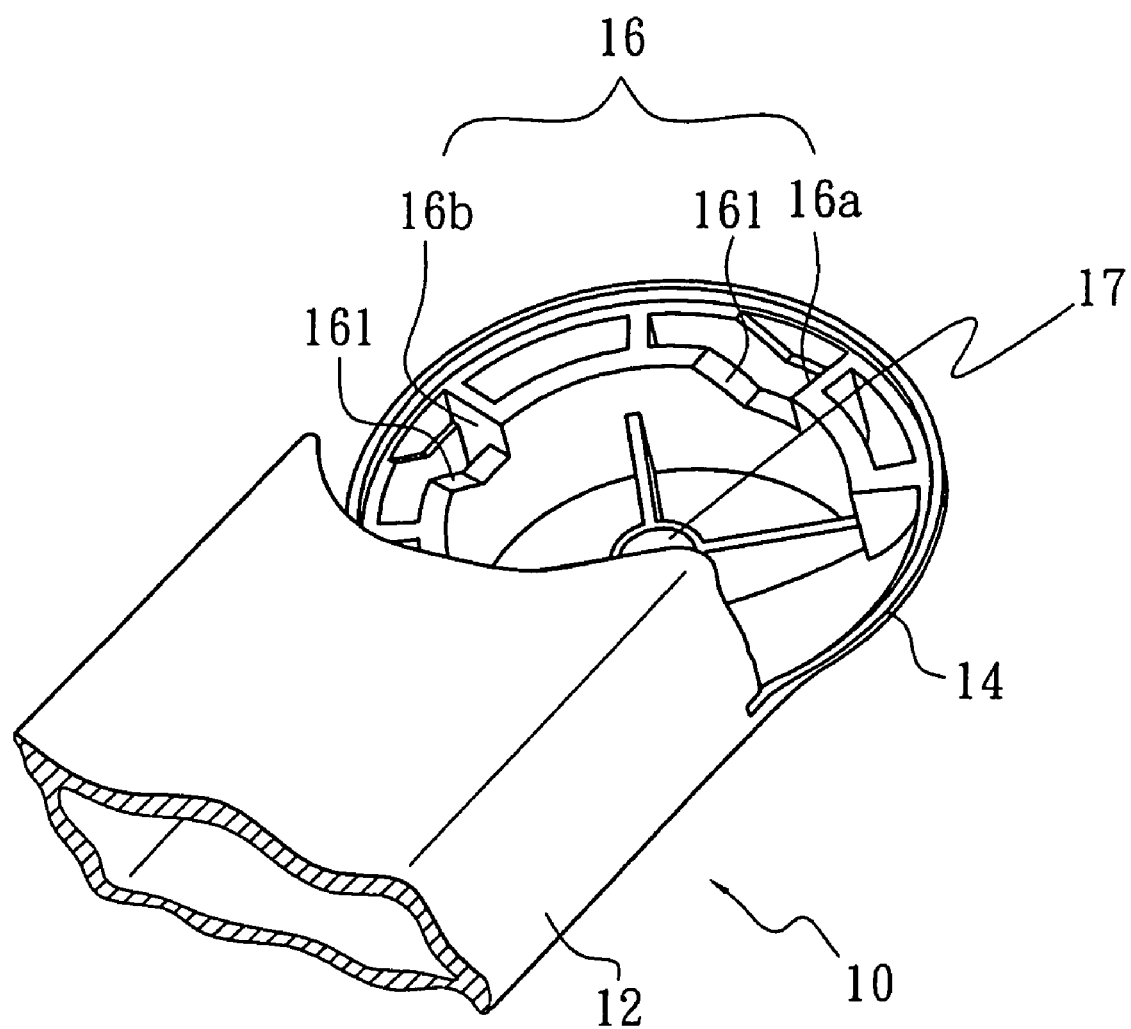
FIG. 3 is a perspective view of an armrest support and illustrates that there are a plurality of engaging notches formed in the coupling portion of the armrest support.

Further referring to FIG. 3 which illustrates the structure of the armrest support 10. As shown in FIG. 3, the armrest support 10 includes a supporting portion 12 coupled to a child car seat (not shown) at one end thereof, and a coupling portion 14 formed at the other end of the supporting portion 12. In this embodiment, four engaging notches 16 are formed at one side of the coupling portion 14 at peripheral positions evenly angularly spaced apart 90° from each other (only two engaging notches are shown in the drawing, i.e., the notch 16a at longitudinal position and the notch 16b angularly spaced apart 90° from the notch 16a). Each of the engaging notches 16 has an inclined face 161. In addition, a through hole 17 is formed at the center of the coupling portion 14.

Referring back to FIG. 1, the armrest 20 mainly comprises an armrest portion 22 and a substantially connecting portion 24 formed at one end of the armrest 20. The connecting portion 24 includes a partition 26 which defines a receiving space with a bottom of the connection portion 24 and a through hole 25, 27 is formed in the partition 26 and the bottom of the connecting portion 24 respectively. The connecting portion 24 further includes a sidewall 28 which is pivotably coupled to the coupling portion 14 of the armrest support 10. The partition 26 further includes two openings 29, and the sidewall 28 has an opening 21 formed in the top at a position corresponding to the receiving space to allow the button 30 being disposed therethrough. In addition, a plurality of protrusions 23 axially inwardly protrudes out from an inner side of the sidewall 28.

The button 30 includes a body 32 and a spring portion 34 integrally formed at a bottom of the body 32. Additionally, a longitudinal slot 36 is formed in the body 32 at a position corresponding to the through hole 25 of the partition 26 and the through hole 27 of the bottom of the connecting portion 24 and two additional openings 38 are formed in the body 32. When the button 30 is disposed in the receiving space of the connecting portion 24 of the armrest 20 through the opening 21, the spring portion 34 will abut the sidewall 28 of the connecting portion 24 and the top of the button 30 will extends out of the opening 21 and substantially flush with the armrest 20. After the button 30 being disposed in the receiving space of the connecting portion 24 of the armrest 20, the spring 50 is placed in the connecting portion 24. In this illustrated embodiment, the spring 50 is a coil spring.

The engaging block 40 is a substantially circular disc-shaped block and a circular groove 41 is formed in a side facing the partition 26 of the connecting portion 24 for accommodating the spring 50. On the same side of the engaging block 40, two outwardly protruded engaging keys 42 are provided at positions corresponding to the openings 38 of the button 30 and the opening 29 of the partition 26 (see FIGS. 4a and 4b) and a central hole 43 is formed at a position corresponding to the through hole 25 of the partition 26 of the connecting portion 24. Additionally, On this side of the engaging block 40, a plurality of recesses 46 (only two are shown in the drawing) are formed at positions corresponding to the plurality of protrusions 23 on the sidewall 28 of the connecting portion 24 for engaging with the protrusions 23 to prevent the engaging block 40 from rotating relative to the connecting portion of the armrest 20. In addition, four engaging teeth 45a, 45b, 45c and 45d are formed on a side that is opposite to the side formed with the circular groove 41 of the engaging block 40 and each of the teeth is angularly spaced apart from each other 90° and has a inclined surface portion 451. Then, the armrest 20 along with the button 30, spring 50 and engaging block 40 installed therein are coupled to the armrest support 10 with the engaging teeth 45 of the engaging block 40 align with the engaging notches 16 of the coupling portion 14 of the armrest support 10, and are pivotably secured thereto by means of a fastener, such as a pivot 60, passing through the through hole 27 of the bottom of the connecting portion 24, the through hole 25 of the partition 26, the longitudinal slot 36 of the button body 32, the central hole 43 of the engaging block 40 and the through hole 17 of the coupling portion 14 of the armrest support 10 to thereby being assembled as the state shown in solid line of FIG. 2 and the button 30 is retained in the connecting portion 24 and movably accommodating in the receiving space through the longitudinal slot 36.

Figure 4A:
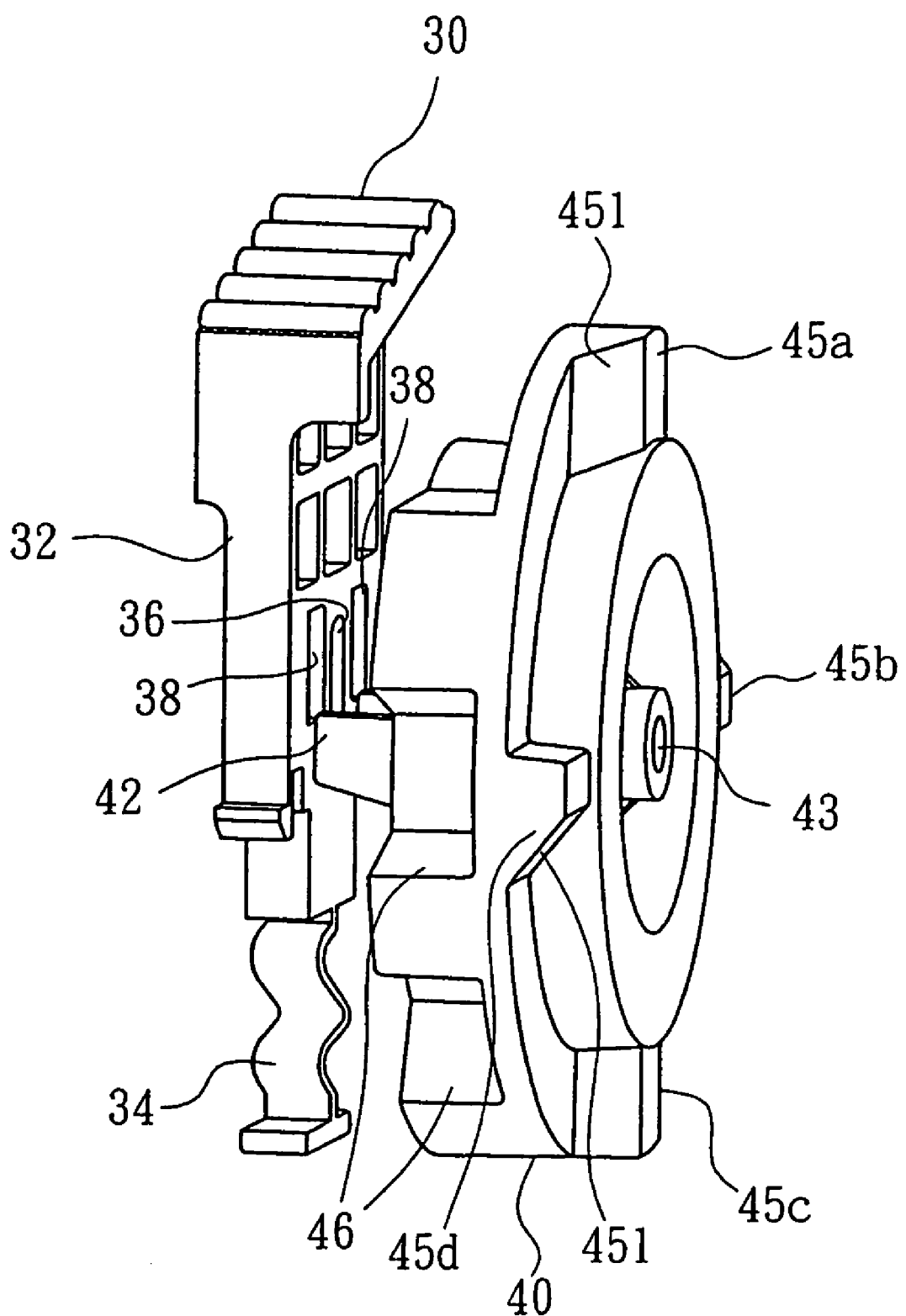
Figure 5A:
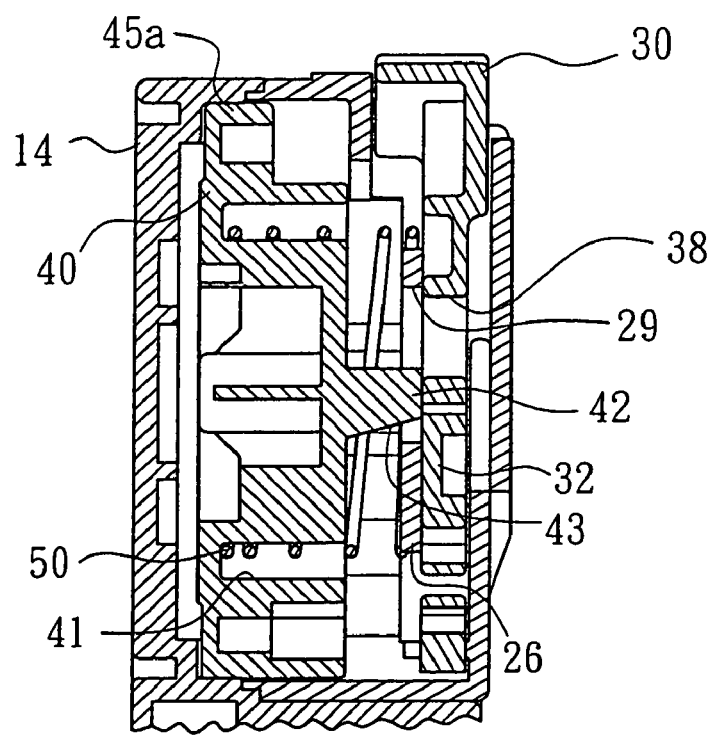
FIGS. 5a and 5b are cross-sectional views of adjusting device for armrest of a child car seat of the present invention and illustrate the spatial relationship among the components while in a locked stage and in an armrest adjusting stage respectively.

While the armrest is in the horizontal position, because the engaging keys 42 of the engaging block 40 and the openings 38 of the button body 32 are misaligned, that is, the engaging keys 42 of the engaging block 40 is against the button body 32, the engaging block 40 is unable to move between the connecting portion 24 and the coupling portion 14 to allow the engaging block 40 to engage with the connecting portion 24 and the coupling portion 14 (as shown in FIG. 4a), and thus the engaging block 40 is pushed partially into the coupling portion 14 of the armrest support 10 and the engaging teeth 45 is pushed into engagement with the engaging notches 16 of the coupling portion 14, as shown in FIG. 5a. Because a portion of the engaging block 40 is pushed into the coupling portion 14 of the armrest support 10 and engages with the engaging notches 16 of the coupling portion 14, the engaging block 40 is thus unable to rotate with respective to the armrest support 10, and in addition to this, the engagement between the recesses 46 of the engaging block 40 and the protrusions 23 of the connecting portion 24 of the armrest 20 makes the engaging block 40 unable to rotate with respective to the armrest 20. Therefore, while in the state, the armrest 20 is locked in the substantially horizontal position (i.e., the position shown in solid line of FIG. 2) through the simultaneously engagements of the engaging block 40 with the notches 16 of the armrest support 10 and with the protrusions 23 of the armrest 20, and thus is unable to rotate with respective to the armrest support 10.

Figure 4B:
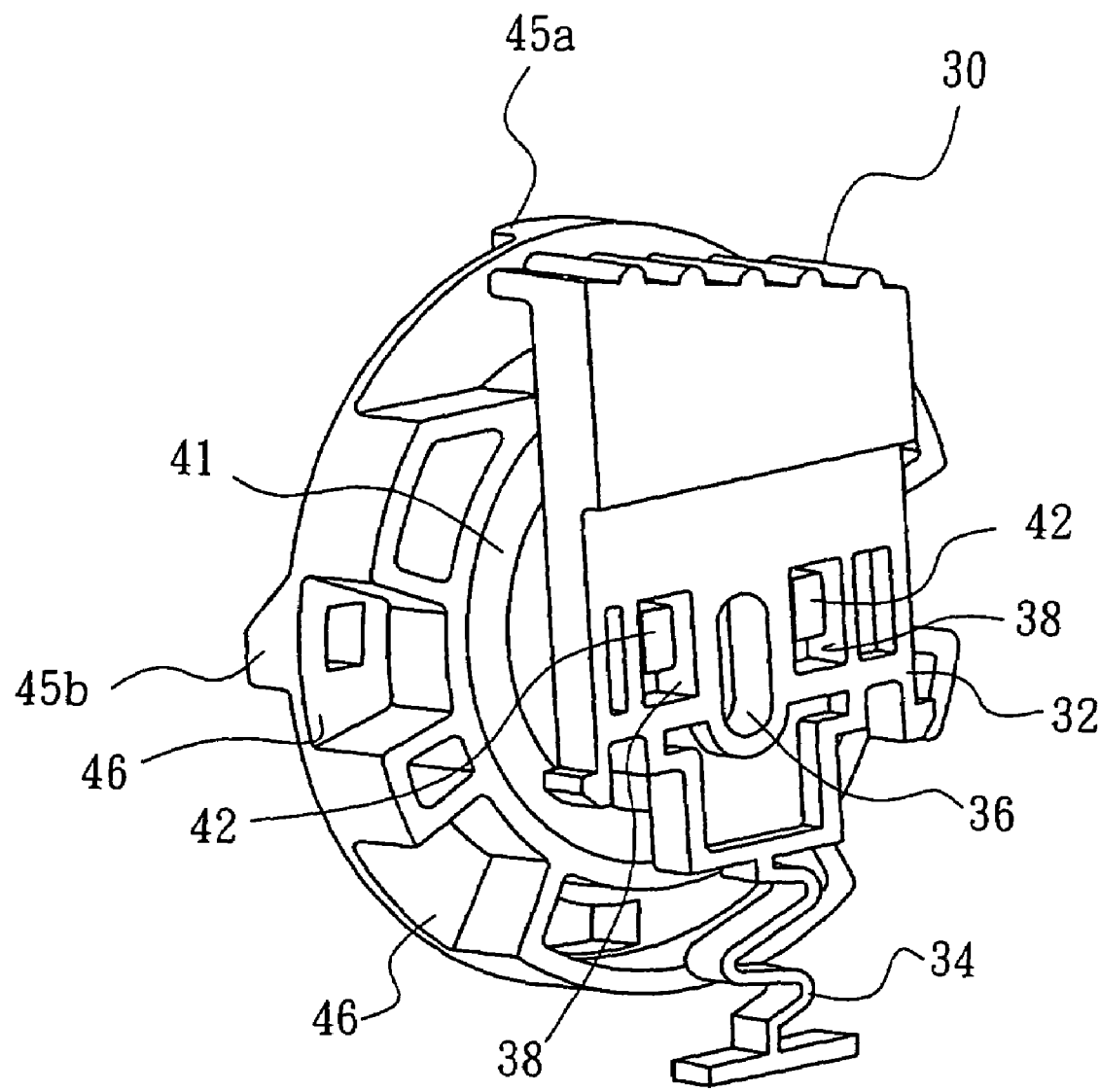
Figure 5B:
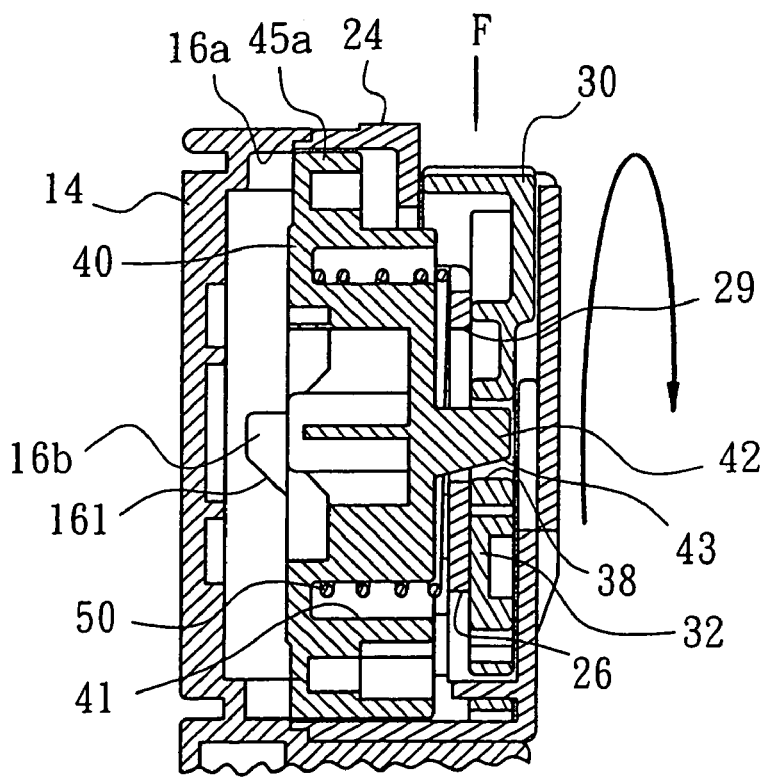

When the armrest 20 is to be adjusted, a force F is applied to press down the button 30 and to compress the spring portion 34 of the button 30 so as to cause the openings 38 of the body 32 being moved to a position that is in alignment with the openings 29 of the partition 26 and the engaging keys 42 of the engaging block 40, that is, the engaging keys 42 of the engaging block 40 is no longer against the button body 32 and the engaging block 40 is now allowed to move between the connecting portion 24 and the coupling portion 14. At this moment, pivoting the armrest 20 relative to the armrest support 10 so as to make the engaging block 40 to rotate simultaneously. During this pivoting process, the engaging teeth 45 are urged out from the engaging notches 16 by the action occurred between the inclined surface portion 451 of the engaging teeth 45 and the inclined face 161 of the notches 16, and abut the coupling portion 14 at positions outside the notches 16 to thereby maintain the armrest 20 at a substantially upright open position as shown in broken line of FIG. 2. In addition, at the time when the engaging teeth 45 are urged out from the engaging notches 16, the engaging block 40 is moved toward the connecting portion 24, such that the engaging keys 42 pass through the openings 29 of the partition 26 and insert into the openings 38 of the button body 32, and the spring 50 is thus compressed, as shown in FIGS. 4b and 5b.

When the armrest 20 is to be move back to its substantially horizontal position, the armrest 20 can be pivoted downward without other operation, and the engaging block 40 is rotated with the armrest 20 to a position that the engaging teeth 45 is substantially in alignment with the engaging notches 16, the restoring force of the compressed spring 50 will push the engaging block 40 toward the coupling portion 14 of the armrest support 10 to make the engaging teeth 45 of the engaging block 40 once again engage with the notches 16 of the coupling portion 14 of the armrest support 10, and thereby lock the armrest 20 in the position shown in solid line of FIG. 2. While the engaging block 40 is pushed toward the coupling portion 14 of the armrest support 10, the engaging keys 42 of the engaging block 40 are withdrawn from the openings 38 of the button body 32 and the button 30 is returned to its initial position by its spring portion 34.

Through the use of the above described adjusting device for an armrest of a child car seat of the present invention, not only the adjustment of the armrest can be accomplished through a simple push to the button, the production costs may be lowered because of the fewer parts be used and the reliability is increased because the simplified structure.

Although this invention has been disclosed in terms of preferred embodiments, it is to be appreciated that the present invention is not limited thereto. For instance, the number of the engaging notches 16 of the coupling portion 14 of the armrest support 10 and the engaging teeth 45 of the engaging block 40 does not have to be 4 as described above, fewer or more engaging notches 16/engaging teeth 45 is also applicable as long as the number of the engaging notches 16/engaging teeth 45 match each other, such as 3 or 6 engaging notches 16/engaging teeth 45 can also be used in the present invention. In addition, the spring portion 34 of the button 30 does not have to be formed integrally with the button 30, it can be a separate spring component.

It will be apparent to people skilled in this art that many modifications can be made to the disclosed structures without departing from the scope of the invention. Therefore, it is the intent of the appended claims to cover all such variations and modifications as come within the sprit and scope of this invention.

What is claimed is:

1. An adjusting device for an armrest of a child car seat, the adjusting device comprising:
    an armrest support including a supporting portion and a coupling portion having a first engaging structure formed thereon;
    an armrest including an armrest portion and a connecting portion, wherein the connecting portion is pivotably coupled to the coupling portion of the armrest support and has a second engaging structure formed thereon;
    a button operably disposed in the connecting portion of the armrest and including a body having a third engaging structure formed thereon; and
    an engaging assembly operably disposed between the connecting portion of the armrest and the coupling portion of the armrest support, and including an engaging block and a spring member operably biasing the engaging block toward the coupling portion of the armrest support, wherein the engaging block includes a fourth engaging structure for engaging with the second engaging structure of the connecting portion, a fifth engaging structure for selectively engaging/disengaging with the first engaging structure of the coupling portion, and a sixth engaging structure constructed such that when the first engaging structure engages with the fifth engaging structure, the sixth engaging structure will disengage from the third engaging structure of the button and thereby the armrest is locked relative to the armrest support, and when the first engaging structure is caused to disengage from the fifth engaging structure, the armrest is free to pivot relative to the armrest support and the sixth engaging structure engages with the third engaging structure of the button.

2. An adjusting device for an armrest of a child car seat according to claim 1, wherein the spring member is a coil spring.

3. An adjusting device for an armrest of a child car seat according to claim 1, wherein the button further comprises a longitudinal through hole formed in the body to allow a pivot passing therethrough so as to allow the button to move in the connecting portion.

4. An adjusting device for an armrest of a child car seat according to claim 1, wherein the connecting portion of the armrest further comprises a partition which defines a space in the connecting portion for accommodating the button therein.

5. An adjusting device for an armrest of a child car seat according to claim 1, wherein the connecting portion of the armrest includes a bottom and a sidewall and the second engaging structure includes a plurality of protrusions axially inwardly protruding out from the sidewall of the connecting portion of the armrest.

6. An adjusting device for an armrest of a child car seat according to claim 5, wherein the fourth engaging structure includes a plurality of recesses formed on one side of the engaging block facing the connecting portion corresponding to the plurality of protrusions of the second engaging structure.

7. An adjusting device for an armrest of a child car seat according to claim 1, wherein the third engaging structure includes at least one engaging through hole formed in the body of the button.

8. An adjusting device for an armrest of a child car seat according to claim 7, wherein the sixth engaging structure includes at least one engaging key protruding out from one side of the engaging block facing the connecting portion of the armrest.

9. An adjusting device for armrest of a child car seat according to claim 1, further comprising a button returning means for operably biasing the button.

10. An adjusting device for an armrest of a child car seat according to claim 9, wherein the button returning means is integrally formed with the button.

11. An adjusting device for an armrest of a child car seat according to claim 1, wherein the first engaging structure includes a plurality of engaging notches formed in a side of the coupling portion facing the engaging assembly.

12. An adjusting device for an armrest of a child car seat according to claim 11, wherein the fifth engaging structure includes a plurality of teeth formed on one side of the engaging block facing the coupling portion of the armrest support at positions corresponding to the engaging notches.

13. An adjusting device for an armrest of a child car seat according to claim 12, wherein each of the plurality of engaging notches has a first acting inclined face, and each of the plurality of teeth has a second acting inclined face for cooperating with the first acting inclined face.

14. An adjusting device for an armrest of a child car seat, the adjusting device comprising:
  an armrest support including a supporting portion and a coupling portion;
  an armrest including an armrest portion and a connecting portion, which is pivotably coupled to the coupling portion of the armrest support;
  a button operably disposed in the connecting portion of the armrest and including a body and an engaging through hole; and
  an engaging assembly operably disposed between the connecting portion of the armrest and the coupling portion of the armrest support and including a engaging key which is constructed such that when the body of the button is caused to abut the engaging key, the engaging assembly will restrain the armrest from pivoting relative to the armrest support, and while the button is actuated to align the engaging through hole with the engaging key, the armrest together with the engaging assembly may pivot relative to the armrest support.

15. An adjusting device for an armrest of a child car seat according to claim 14, wherein the engaging assembly includes a first acting inclined face, and the coupling portion of the armrest support includes an engaging notch and the engaging notch has a second acting inclined face for cooperating with the first acting inclined face such that an operative cooperation between the first and second acting inclined faces may cause the engaging assembly to pivot relative to the armrest support.

16. An adjusting device for an armrest of a child car seat according to claim 14, wherein the engaging assembly comprises a spring member which operably biases the engaging assembly toward the armrest support.

* * * * *